E. ZANNETTI.
BRAKE ACTUATING DEVICE.
APPLICATION FILED AUG. 16, 1921.
1,427,047.
Patented Aug. 22, 1922.
2 SHEETS—SHEET 2.
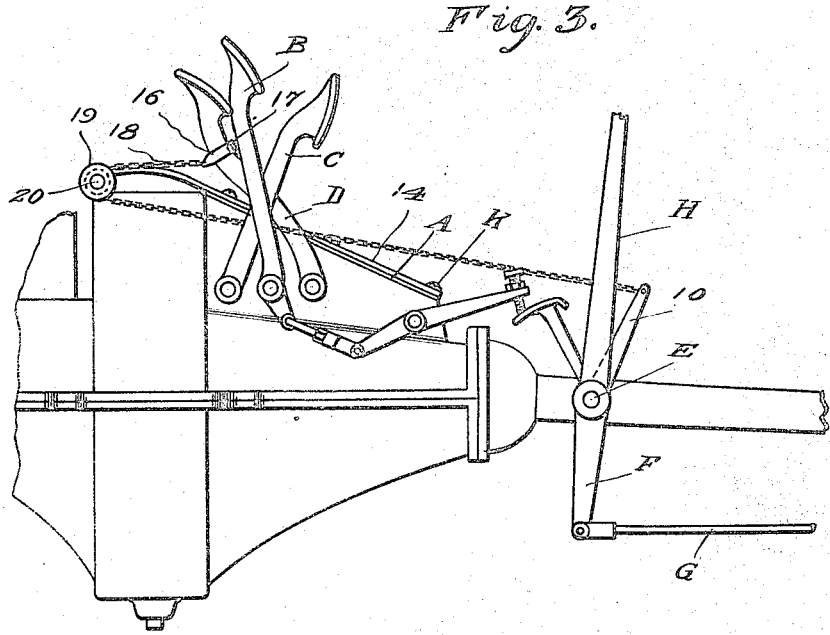
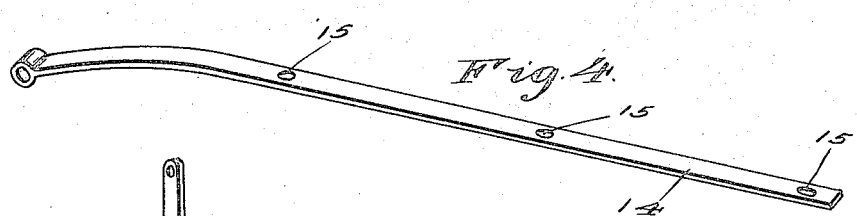
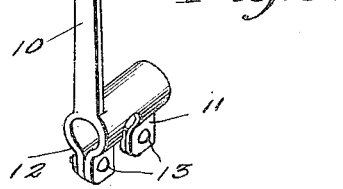
Inventor
Emanuel Zannetti
By Victor J. Evans
Attorney
Witnesses

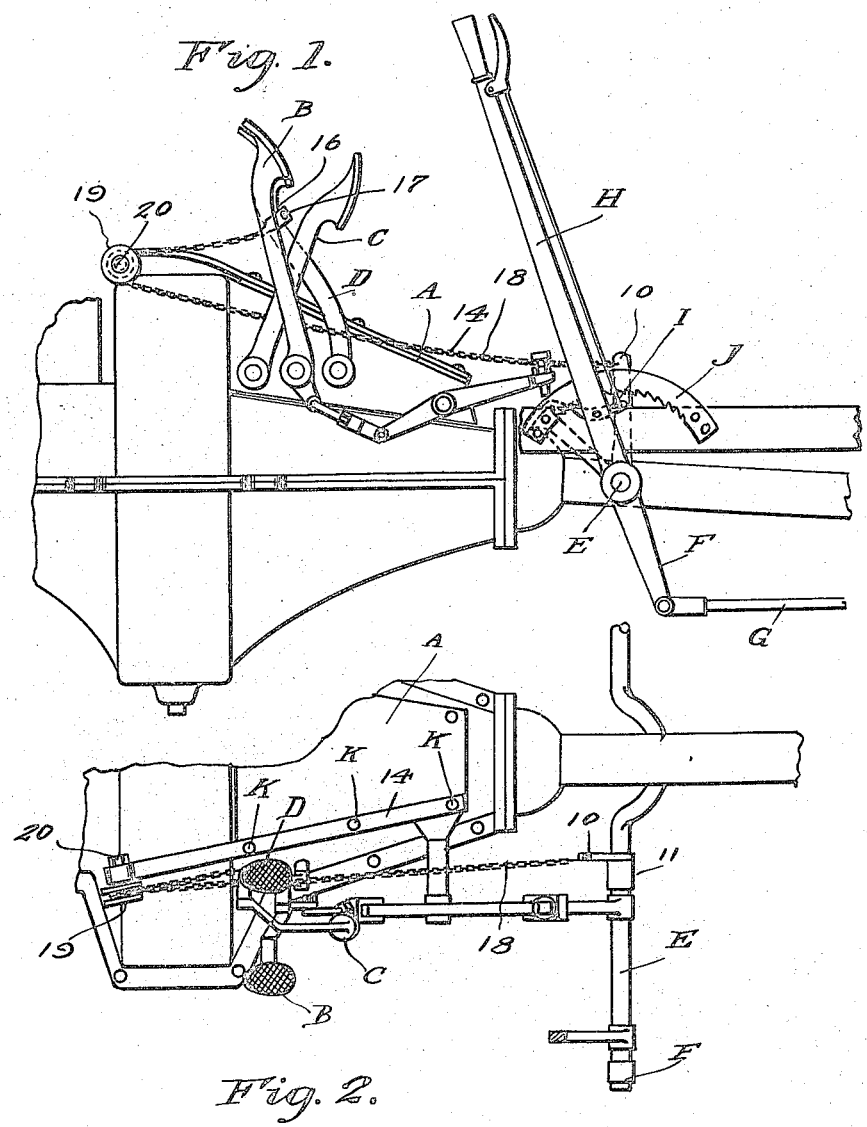

UNITED STATES PATENT OFFICE.

EMANUEL ZANNETTI, OF GLOVERSVILLE, NEW YORK.

BRAKE-ACTUATING DEVICE.

1,427,047.  Specification of Letters Patent.  Patented Aug. 22, 1922.

Application filed August 16, 1921. Serial No. 492,720.

*To all whom it may concern:*

Be it known that I, EMANUEL ZANNETTI, a citizen of Italy, residing at Gloversville, in the county of Fulton and State of New York, have invented new and useful Improvements in Brake-Actuating Devices, of which the following is a specification.

This invention relates to attachments for Ford automobiles, particularly to brake devices, and has for its object the provision of a novel connection between the emergency brake setting shaft and the pedal operated transmission brake whereby setting of the emergency brake will simultaneously cause setting of the transmission brake.

An important and more specific object is the provision of a lever device adapted to be clamped upon the crank shaft which controls the emergency brake and flexibly connected with a suitable clip designed to be engaged upon the brake pedal, a suitable guide pulley being properly supported with respect to the transmission cover whereby to provide the proper direction of pull for actuating the brake pedal automatically when the hand lever of the emergency brake system is pulled back.

Another object is the provision of a device of this character in which the construction is such that any wear may be taken up or other slackness may be removed so that the device will efficiently operate at all times.

An additional object is the provision of a device of this character which will be simple and inexpensive in manufacture, easy to install, positive in action, automatic in operation, durable in service and a general improvement in the art.

With the above and other objects in view, the invention consists in the details of construction to be hereinafter more fully described and claimed, and illustrated in the accompanying drawings in which, Figure 1 is a side elevation showing my mechanism associated with a Ford automobile, Figure 2 is a plan view thereof, Figure 3 is a view similar to Figure 1 but showing the hand brake and consequently the foot brake in set position, Figure 4 is a detail perspective view of the supporting members secured upon the transmission cover and Figure 5 is a perspective view of the operating member which is clamped upon the emergency brake crank setting shaft.

Referring more particularly to the drawings, the letter A designates the transmission cover of a Ford automobile, B designates the combined low speed and clutch pedal, C designates the reverse pedal, D designates the brake pedal, E designates the transverse shaft which is provided with a crank and which carries the usual arms F connected with the pull rod G which catch the emergency brake not shown. The letter H designates the hand lever which is secured upon one end of the shaft E whereby to effect rocking movement thereof, and the hand lever is of course provided with the usual grip release locking pawl I cooperating with the notch segment J ordinarily provided. It is well known that in the Ford automobile when either the brake lever is operated or the emergency hand lever is pulled there is absolutely no effect produced upon the other. In other words it might be stated that actuation of the pedal which controls the transmission brake has no effect upon the hand lever which controls the emergency brake and vice versa. In a great many instances it frequently occurs that the brake shoes of the emergency brake become so worn that the emergency brake fails to hold by itself. It is with this disadvantage in view that the present invention has been designed.

In carrying out my invention I provide an arm 10 which is formed preferably integrally upon but which might be secured upon a clamping element 11 designed to be engaged upon the shaft E and having cooperating therewith a clamping element 12, the clamping members 11 and 12 being secured together by means of suitable bolts 13 or the like. It might be stated that the arm 10 is of considerable length so that an appreciable leverage will be obtained. Disposed upon the top of the transmission cover A is an elongated metallic strip 14 which is curved as shown and which is provided throughout its length with a plurality of holes 15 adapted to be brought into registration with the usual holes provided at the edge of the opening in the transmission cover, the usual screws K being inserted through these registering holes whereby to hold the strip 14 in position. The shape of this strip 14 is such that the forward end thereof is curved upwardly and will be disposed above the larger portion of the transmission cover A as clearly disclosed in the drawings.

The numeral 16 designates a clip which is formed of metal and which may conveniently be of U shape and which is designed to be secured upon the brake pedal B as by means of a suitable securing bolt 17. Connected with this clip 16 is a chain 18 which is trained over the pulley 19 which is journaled upon a lateral extension 20 carried by the forward end of the strip 14. The other end of this chain is connected with the free end of the arm 10 as clearly shown.

The operation of the device is as follows; Assuming that my structure has been associated with the emergency brake operating shaft E and with the brake pedal D, when the emergency brake is in its release position, it will be apparent that there will be absolutely nothing to interfere with the ordinary operation of the brake pedal. When, however, the operator grasps the hand lever H and pulls backwardly thereon to effect setting of the emergency brake, it will be apparent that a pull will be produced on the chain 18 and as this chain is trained about the pulley 19 and is connected with the clip 16 which is secured upon the brake pedal it will be obvious that the pedal will be moved forwardly in exactly the same manner as if it had been depressed by the foot of the operator. In this way it will be seen that when the operator pulls back upon the hand lever for setting the emergency brake the foot pedal controlling the transmission brake will be correspondingly moved whereby the brake will be set automatically so that any possible moving of the machine will be absolutely prevented.

From the foregoing description and a study of the drawings it will be apparent that I have thus provided an extremely simple and consequently inexpensive attachment for Ford automobiles whereby to effect setting of the foot brake simultaneously with the setting of the emergency brake so that any possibility of movement of the automobile will be prevented except of course in the breakage of parts.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim;

1. The combination with the emergency brake setting shaft of a Ford automobile and with the foot brake pedal, of a clamping device adapted to be secured upon the crank shaft of the emergency brake apparatus and including an extending arm, a supporting member secured upon the transmission cover and carrying a pulley, and a flexible member connected with said arm, trained over said pulley and connected with the brake pedal.

2. In combination with the emergency brake setting shaft of a Ford automobile and with the foot pedal thereof, a clamping member detachably engageable upon the emergency brake setting crank shaft and including an arm, an elongated strip secured upon the transmission cover by the usual screws provided for holding the transmission cover door in position, a pulley journaled at the forward extremity of said strip, a flexible member connected with said arm, trained over said pulley, and a clip carried by the free end of said chain and detachably engaged upon the foot pedal.

3. An automatic braking device for Ford automobiles comprising the combination with the emergency brake setting shaft and with the foot pedal, of a clamping device designed to be engaged upon the emergency brake setting crank shaft and including an elongated forwardly extending arm, a strip secured upon the transmission cover by the usual screws provided for holding the transmission cover door in position, said strip having its forward extremity curved upwardly and being provided near its forward end with a lateral extension, a pulley rotatably mounted upon said extension, a chain pivotally connected with the free end of said arm, trained over said pulley and having its other end detachably connected with the brake pedal.

In testimony whereof I affix my signature.

EMANUEL ZANNETTI.